Patented Jan. 2, 1934

1,941,626

UNITED STATES PATENT OFFICE 1,941,626

PROCESS OF DECOLORIZING HEAVY SPAR

Maximilian Schiechel, Frankfort-on-the-Main, Germany, assignor to American Lurgi Corporation, New York, N. Y., a corporation of New York No Drawing. Application November 16, 1931, Serial No. 575,463, and in Germany November 25, 1930

11 Claims. (Cl. 23—122)

This invention relates to a process of decolorizing heavy spar.

In order to transform native heavy spar, which is more or less colored by impurities into a product, as pure white as possible, it has already been proposed to subject the original material to a treatment with acid, or to a combined calcination and acid treatment, the intention being generally to eliminate the organic, bituminous constituents by the calcination, and the inorganic coloring constituents, such as oxides of iron and manganese, by the acid treatment.

In place of the acid treatment, it has also been proposed to extract the inorganic coloring matters, such as oxides of iron and manganese, from the heavy spar, by fusing the latter with large quantities—up to ten times its own weight—of sodium bisulphate, and leaching the fused product, which contains the iron as sulphate, with water, reducing agents being added, if desired, in order to convert the iron into the more soluble ferrous sulphate.

According to the present invention, the decoloration of heavy spar is effected solely by a calcination process with addition of substances which are adapted to render harmless the coloring substances in the heavy spar, especially to transform the inorganic coloring compounds in said heavy spar into colorless compounds, or into compounds of a color,—for instance blue—which is not disturbing. This process renders innocuous both the organic and inorganic coloring constituents, and dispenses with the treatment with acid or acid melts, and all washing.

The most suitable additions have been found to consist of oxides and/or other compounds of metals and metalloids containing oxygen, such as those of sodium, potassium, aluminium, magnesium zinc, zirconium and the like, which in given cases may be more or less colored themselves. Two or more of the said substances may also be employed jointly.

Investigations made by the inventor justify the assumption that the decolorizing effect obtained by calcining the heavy spar with addition of the said substances results from the transformation of the colored compounds of iron, manganese and the like in the initial material into, for example, silicates, double silicates or complex silicates which are colorless or are not colored in a disturbing manner. As a rule, crude heavy spar already contains sufficient amounts of silica for this purpose. Otherwise, it is advisable to add free or combined silica, or substances containing same in addition to the aforesaid substances to the heavy spar prior to calcination.

With regard to the amount of additions to be employed, this will generally depend on the amount and nature of the impurities contained in the heavy spar. Since the amount of these latter is generally small, it will usually be sufficient to take small quantities of said additions, for example, about 0.5–1% of an oxide or other oxygen containing compound, such as sodium- or potassium carbonate, sulphate or nitrate, sodium silicate, zinc oxide, zinc sulphate or the like.

Calcination is advantageously performed at between about 900 and 1300° C. and preferably between about 1100 and 1200° C., reducing influences being precluded as far as possible, preferably in an oxidizing or at least a not reducing atmosphere, for example, by direct action of gases of combustion, using an oxidizing flame. To ensure the presence of an excess of oxygen, it is advisable either to provide for the admission of sufficient quantities of gases containing oxygen—especially air—to the charge material during calcination, or to incorporate with the charge (as well as the aforesaid additions) prior to calcination substances, such as an alkali metal nitrate, which will give off oxygen at the calcination temperatures. Alternatively, both measures may be adopted conjointly. Even small quantities—such as about 0.25–0.5% of the heavy spar—of the additions supplying oxygen, have generally proved ample.

If desired, additions which are capable of furnishing oxygen and, at the same time, exerting a decolorizing action, may also be employed.

The additions may be added to the (preferably suitably crushed) heavy spar, in a solid form, or, if desired, in solution.

In comparison with the aforesaid known calcination process and treatment with acids, or fusion with large quantities of sodium bisulphate, the process of the present invention offers the advantage of enabling the organic and inorganic coloring constituents to be rendered harmless in a single operation, thus saving the expense of the considerable consumption of acid or sulphate, and also the disagreeable task of working with strongly acid liquids, especially hot hydrochloric acid, and attendant cost of acid-proof apparatus fittings, and the considerable amount of labour involved in the various leachings.

Inasmuch as, by means of a single treatment—a simple calcination—requiring very small amounts of extremely cheap additions, and without any after treatment, the present process furnishes a product in which the coloring effect of both the inorganic and organic impurities is completely suppressed, it implies an exceedingly valuable improvement especially in the art of treating heavy spar, or any minerals, in which heavy spar is present as a substantial constituent.

The described process, in addition to being used for decolorizing heavy spar, may also be employed for decolorizing other kinds of minerals, such as fluor spar or other materials, for instance colored zinc oxide, lithopone and the like, the temperatures for the calcination being chosen generally according to the nature of the material to be treated, or, in given cases also according to the kind of additions.

*Examples*

(1) 100 grams of reddish-yellow crude heavy spar, previously crushed and sifted through a screen of 0.5 mm. width of mesh in the clear, and having the composition: $BaSO_4$, 95.1%; $Fe_2O_3$, 0.28%; $Mn_2O_3$, 0.06%; $SiO_2$, 4.6% with traces of $CaCO_3$, alkali, MgO, $P_2O_5$ were thoroughly mixed with 0.5 grams of sodium sulphate and 0.25 grams of potassium nitrate. The mixture was placed in a roasting dish and calcined at 1150° C., for half an hour, in an electric muffle, without stirring. The calcined product was snow white in color.

(2) 100 grams of the same heavy spar, crushed to 0.5 mm., were well mixed with 0.5 grams of sodium sulphate, the mixture being calcined under the same conditions as in Example 1, also without stirring. The product was snow white on the outside, but still slightly reddish in the interior.

(3) 100 grams of the same heavy spar, crushed to 0.5 mm., were well mixed with 0.5 grams of zinc oxide and 0.25 grams of potassium nitrate, and calcined in exactly the same way as set forth in Example 1. In this case also a snow white product was obtained.

(4) 100 grams of the same heavy spar, crushed to 0.5 mm., were well mixed with 1 gram of waterglass (sodium silicate) and 0.25 grams of potassium nitrate, the mixture being calcined, without stirring, as set forth in the preceding examples. The product was snow white throughout.

(5) 3000 kg. of the same crude heavy spar were ground to 0.5 mm. grain size in admixture with 0.5% of calcined Glauber's salt and 0.25% of potassium nitrate, and heated to 1150° C. in a rotary calcining tube drum, by the direct action of producer gas. The material issuing from the drum was ground to meal when cold, and furnished a perfectly snow white product.

(6) The identical quantity of the same crude heavy spar was treated in exactly the same manner as set forth in Example 5, but without the addition of potassium nitrate. The resulting product entirely corresponded to that of Example 5 in quality, opportunity having been continuously provided for the charge to come into contact with air in the rotary tube.

By the expression "oxygen-containing compounds of the group comprising the oxides and mineral acid salts of potassium, sodium, aluminum, magnesium, zinc and zirconium" in the appended claims are to be understood not only oxides and strong mineral acid salts of the named elements, but also oxygen-containing compounds thereof, such as hydroxides and oxy salts and compounds of oxygen-containing weak mineral acids, such as the carbonates and silicates.

I claim:

1. Process of decolorizing heavy spar which comprises heating the heavy spar in admixture with a relatively small amount of an added oxygen containing compound of the group comprising the oxides and mineral acid salts of potassium, sodium, aluminum, magnesium, zinc, and zirconium to a temperature of at least about 900° C. but below the fusion temperature.

2. Process of decolorizing heavy spar as defined in claim 1 in which the mixture is heated in an non-reducing atmosphere.

3. Process of decolorizing heavy spar as defined in claim 1 in which the mixture is heated in an oxidizing atmosphere.

4. Process of decolorizing heavy spar as defined in claim 1 in which the heating temperature is maintained at from about 900° C. to about 1300° C.

5. Process of decolorizing heavy spar as defined in claim 1 in which the heating temperature is maintained at from about 1100° C. to about 1200° C.

6. Process of decolorizing heavy spar as defined in claim 1 in which the mixture contains silica or a silicate.

7. Process of decolorizing heavy spar as defined in claim 1 in which a solid oxidizing agent is added to the mixture.

8. Process of decolorizing heavy spar as defined in claim 1 in which the oxygen containing compound is an oxidizing agent.

9. Process of decolorizing heavy spar as defined in claim 1 in which the quantity of oxygen containing compound used amounts to from 0.5 to 1% of the heavy spar.

10. Process of decolorizing heavy spar as defined in claim 1 in which the heating of the heavy spar is carried out in the presence of an oxidizing gas and under movement of the heavy spar whereby fresh surfaces thereof are exposed to the gas.

11. Process of decolorizing heavy spar which comprises heating the same under agitation at a temperature of from about 900° C. to about 1300° C. in the presence of an added relatively small amount of an oxygen compound of the group comprising the oxides and mineral acid salts of potassium, sodium, aluminum, magnesium, zinc, and zirconium, a solid oxidizing agent, silica in free or combined form and an oxidizing gas.

MAXIMILIAN SCHIECHEL.